(12) United States Patent
Liu et al.

(10) Patent No.: US 12,432,050 B2
(45) Date of Patent: *Sep. 30, 2025

(54) MANAGING DATA AVAILABILITY ON ENCRYPTION KEY STATUS CHANGES IN REPLICATED STORAGE SYSTEMS

(71) Applicant: Google LLC, Mountain View, CA (US)

(72) Inventors: Bonan Liu, New York, NY (US); Ramesh Rathan Dharan, New York, NY (US); Michelle Morgan Socher, New York, NY (US); Shuen Wen Si, Mountain View, CA (US); Anwesha Das, New York, NY (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/653,459

(22) Filed: May 2, 2024

(65) Prior Publication Data
US 2024/0291638 A1   Aug. 29, 2024

Related U.S. Application Data

(63) Continuation of application No. 17/452,987, filed on Oct. 29, 2021, now Pat. No. 12,010,218.

(51) Int. Cl.
*H04L 29/06* (2006.01)
*H04L 9/08* (2006.01)
(Continued)

(52) U.S. Cl.
CPC .......... *H04L 9/0825* (2013.01); *H04L 9/0866* (2013.01); *H04L 9/14* (2013.01); *H04L 67/1095* (2013.01); *H04L 67/561* (2022.05)

(58) Field of Classification Search
CPC ... H04L 9/0825; H04L 67/561; H04L 9/0866; H04L 9/14; H04L 67/1095; H04L 63/0428; G06F 16/27; G06F 3/067; G06F 21/065
See application file for complete search history.

(56) References Cited

U.S. PATENT DOCUMENTS

| | | | |
|---|---|---|---|
| 6,681,017 B1 | 1/2004 | Matias et al. | |
| 8,166,314 B1 | 4/2012 | Raizen et al. | |

(Continued)

FOREIGN PATENT DOCUMENTS

| | | |
|---|---|---|
| EP | 3 782 328 A1 | 2/2021 |
| WO | 2017218590 A1 | 12/2017 |
| WO | 2019204487 A1 | 10/2019 |

OTHER PUBLICATIONS

International Search Report and Written Opinion for the related Application No. PCT/US2022/ 078864, dated Mar. 1, 2023, 259 pages.

(Continued)

*Primary Examiner* — Yogesh Paliwal
(74) *Attorney, Agent, or Firm* — Shumaker & Sieffert, P.A.

(57) ABSTRACT

A method includes obtaining a key status for a first cryptographic key. The first cryptographic key is used to encrypt replicated data of a first replication instance. The method also includes determining, based on the key status, that the first cryptographic key is inaccessible which causes the first replication instance to be unavailable. In response to determining that the first cryptographic key is inaccessible, the method includes scheduling a second replication instance to be unavailable after a threshold amount of time has passed. The second replication instance includes replicated data encrypted by a second cryptographic key that is accessible. After the threshold amount of time has passed and when the (Continued)

first cryptographic key is still inaccessible, the method includes setting the second replication instance as unavailable.

20 Claims, 8 Drawing Sheets

(51) Int. Cl.
  *H04L 9/14* (2006.01)
  *H04L 67/1095* (2022.01)
  *H04L 67/561* (2022.01)

(56) References Cited

U.S. PATENT DOCUMENTS

| | | | |
|---|---|---|---|
| 8,498,417 | B1 | 7/2013 | Harwood et al. |
| 8,892,875 | B1 | 11/2014 | Baldwin et al. |
| 8,914,362 | B1 | 12/2014 | Zamir et al. |
| 10,922,132 | B1 | 2/2021 | Shiramshetti et al. |
| 11,537,728 | B1 | 12/2022 | Esbensen et al. |
| 12,010,218 | B2 | 6/2024 | Liu et al. |
| 2002/0126850 | A1 | 9/2002 | Allen et al. |
| 2010/0254537 | A1 | 10/2010 | Buer et al. |
| 2012/0233455 | A1 | 9/2012 | Kahler et al. |
| 2014/0201520 | A1 | 7/2014 | Yacobi |
| 2014/0310525 | A1 | 10/2014 | Kohlenberg et al. |
| 2015/0294118 | A1 | 10/2015 | Parker et al. |
| 2016/0085996 | A1 | 3/2016 | Eigner et al. |
| 2016/0191239 | A1 | 6/2016 | Murray |
| 2016/0210200 | A1 | 7/2016 | Kumarasamy et al. |
| 2016/0292249 | A1 | 10/2016 | Vasanth et al. |
| 2017/0264432 | A1 | 9/2017 | Horowitz et al. |
| 2018/0241561 | A1 | 8/2018 | Albertson et al. |
| 2019/0173675 | A1* | 6/2019 | Kaufman .............. H04L 9/0894 |
| 2019/0245918 | A1* | 8/2019 | Xu ...................... H04L 63/0869 |
| 2020/0053065 | A1* | 2/2020 | Wisniewski ............ H04L 63/06 |

OTHER PUBLICATIONS

Prosecution History from U.S. Appl. No. 17/452,987, now issued U.S. Pat. No. 12,010,218, dated Sep. 14, 2023, through Feb. 6, 2024, 29 pp.

Response to Communication Pursuant to Rules 161(1) and 162 EPC dated Jun. 6, 2024, from counterpart European Application No. 22822244.4, filed Nov. 29, 2024, 59 pp.

First Examination Report from counterpart Indian Application No. 202447040426 dated Jul. 11, 2025, 11 pp.

* cited by examiner

MANAGING DATA AVAILABILITY ON ENCRYPTION KEY STATUS CHANGES IN REPLICATED STORAGE SYSTEMS

CROSS REFERENCE TO RELATED APPLICATIONS

This U.S. Patent Application is a continuation of, and claims priority under 35 U.S.C. § 120 from, U.S. patent application Ser. No. 17/452,987, filed on Oct. 29, 2021. The disclosure of this prior application is considered part of the disclosure of this application and is hereby incorporated by reference in its entirety.

TECHNICAL FIELD

This disclosure relates to managing data availability on encryption key status changes in replicated storage systems.

BACKGROUND

Cloud computing has increased in popularity as storage of large quantities of data in the cloud becomes more common. The need for robust storage of data has also grown to protect the increasingly large quantity of data stored in the cloud. Some cloud service providers increase the robustness of cloud data storage by replicating data, storing multiple replication instances of the data, and storing the multiple replication instances at different storage locations. Storing the multiple replication instances of the data at these different storage locations allows users to continue to access and update their data in the event that one of the replication instances becomes unavailable. In such an event, replication instances that are unavailable become inconsistent from replication instances that are available and updated by the user.

SUMMARY

One aspect of the disclosure provides a computer-implemented method that when executed on data processing hardware causes the data processing hardware to perform operations for managing data availability in replicated storage systems. The operations include obtaining a key status for a first cryptographic key. The first cryptographic key is used to encrypt replicated data of a first replication instance. The operations also include determining, based on the key status, that the first cryptographic key is inaccessible which causes the first replication instance to be unavailable. In response to determining that the first cryptographic key is inaccessible, the operations include scheduling a second replication instance to be unavailable after a threshold amount of time has passed. The second replication instance includes replicated data encrypted by a second cryptographic key that is accessible. When the first cryptographic key is still inaccessible after the threshold amount of time has passed, the operations include setting the second replication instance as unavailable.

Implementations of the disclosure may include one or more of the following optional features. In some implementations, before the threshold amount of time has passed, the operations further include obtaining a second key status for the first cryptographic key, determining, based on the second key status, that the first cryptographic key is accessible, and canceling the schedule for the second replication instance to be unavailable. In some examples, after the threshold amount of time has passed, the operations further include obtaining a second key status for the first cryptographic key, determining, based on the second key status, that the first cryptographic key is accessible, and setting the second replication instance as available. In these examples, setting the second replication instance as available includes determining that the second replication instance is unavailable because a different replication instance is unavailable.

The operations may further include storing, in a data store, as replication metadata associated with the first replication instance, an indication that the first replication instance is inaccessible because the first cryptographic key is inaccessible. Here, after the threshold amount of time has passed, the operations may further include storing, at a data store, as replication metadata associated with the second replication instance, an indication that the second replication instance is unavailable because a different replication instance is unavailable. Optionally, in response to determining that the first cryptographic key is inaccessible, the operations may further include scheduling a third replication instance to be unavailable after a second threshold amount of time has passed. The third replication instance includes replicated data encrypted by a third cryptographic key that is accessible.

In some implementations, before the threshold amount of time has passed, the operations further include polling the key status for the first cryptographic key to determine whether the first cryptographic key is accessible. In these implementations, polling the key status for the first cryptographic key includes repeatedly reading replication metadata associated with the first replication instance. In some examples, the first cryptographic key is temporarily inaccessible due to a network outage.

Another aspect of the disclosure provides a system that includes data processing hardware and memory hardware storing instructions that when executed on the data processing hardware cause the data processing hardware to perform operations. The operations include obtaining a key status for a first cryptographic key. The first cryptographic key is used to encrypt replicated data of a first replication instance. The operations also include determining, based on the key status, that the first cryptographic key is inaccessible which causes the first replication instance to be unavailable. In response to determining that the first cryptographic key is inaccessible, the operations include scheduling a second replication instance to be unavailable after a threshold amount of time has passed. The second replication instance includes replicated data encrypted by a second cryptographic key that is accessible. When the first cryptographic key is still inaccessible after the threshold amount of time has passed, the operations include setting the second replication instance as unavailable.

Implementations of the disclosure may include one or more of the following optional features. In some implementations, before the threshold amount of time has passed, the operations further include obtaining a second key status for the first cryptographic key, determining, based on the second key status, that the first cryptographic key is accessible, and canceling the schedule for the second replication instance to be unavailable. In some examples, after the threshold amount of time has passed, the operations further include obtaining a second key status for the first cryptographic key, determining, based on the second key status, that the first cryptographic key is accessible, and setting the second replication instance as available. In these examples, setting the second replication instance as available includes determining that the second replication instance is unavailable because a different replication instance is unavailable.

The operations may further include storing, in a data store, as replication metadata associated with the first replication instance, an indication that the first replication instance is inaccessible because the first cryptographic key is inaccessible. Here, after the threshold amount of time has passed, the operations may further include storing, in a data store, as replication metadata associated with the second replication instance, an indication that the second replication instance is unavailable because a different replication instance is unavailable. Optionally, in response to determining that the first cryptographic key is inaccessible, the operations may further include scheduling a third replication instance to be unavailable after a second threshold amount of time has passed. The third replication instance includes replicated data encrypted by a third cryptographic key that is accessible.

In some implementations, before the threshold amount of time has passed, the operations further include polling the key status for the first cryptographic key to determine whether the first cryptographic key is accessible. In these implementations, polling the key status for the first cryptographic key includes repeatedly reading replication metadata associated with the first replication instance. In some examples, the first cryptographic key is temporarily inaccessible due to a network outage.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

As cloud data warehouses have increased in size and popularity, the amount of data that they ingest has increased exponentially. For example, some replicated storage systems ingest (i.e., receive) hundreds of gigabytes of data and replicate the ingested data for storage across multiple storage locations. Storing the replicated data across multiple storage locations provides a redundant storage solution for the user. That is, in the event that one replication instances is unavailable at a storage location, the data may still be access from a different replication instance at a different storage location.

In these replicated storage systems, each replication instance may be encrypted by a unique encryption key (i.e., data encryption key (DEK)). The DEK may be encrypted by a key encryption key (KEK) that is stored and managed by a key management service (KMS) or other secure entity. As such, the replicated storage system must decrypt the data encryption key via the KMS to encrypt/decrypt the replication instances. In some examples, one or more of the encryption keys used to encrypt one or more of the replication instances become inaccessible or unavailable thereby causing the associated replication instances to be similarly inaccessible. In these examples, a user may still update data associated with the other replication instances that are still available (e.g., replication instances encrypted by encryption keys that remain accessible) while replication logs are committed to the unavailable replication instances. When the inaccessible replication instance becomes accessible (i.e., the keys become assessable), these replication logs allow the unavailable replication instances to update and thereby become consistent with the other replication instances. However, replication logs will continue to accumulate as the encryption key remains inaccessible. Eventually, the replicated storage system may accumulate an unmanageable number of replication logs and/or portions of the replication log are deleted or lost and the replication instances will remain inconsistent.

Implementations herein are directed toward systems and methods for managing data availability in replicated storage systems. An instance manager receives a key status for a first cryptographic key used to encrypt a first replication instance. The instance manager determines that the first cryptographic key is inaccessible thereby causing the first replication instance to be unavailable. Thereafter, the instance manager schedules a second replication instance to become unavailable after a threshold amount of time has passed. If the first cryptographic key is not accessible before the threshold amount of time has passed, the second replication instance becomes unavailable. Alternatively, if the first cryptographic key become accessible before the threshold amount of time has passed, the instance manager cancels the schedule for the second replication instance to become unavailable and sets the first replication instance as available. The instance manager may gradually make any number of replication instances unavailable, allowing for a graceful shutdown of the replication instances.

Figure 1A:
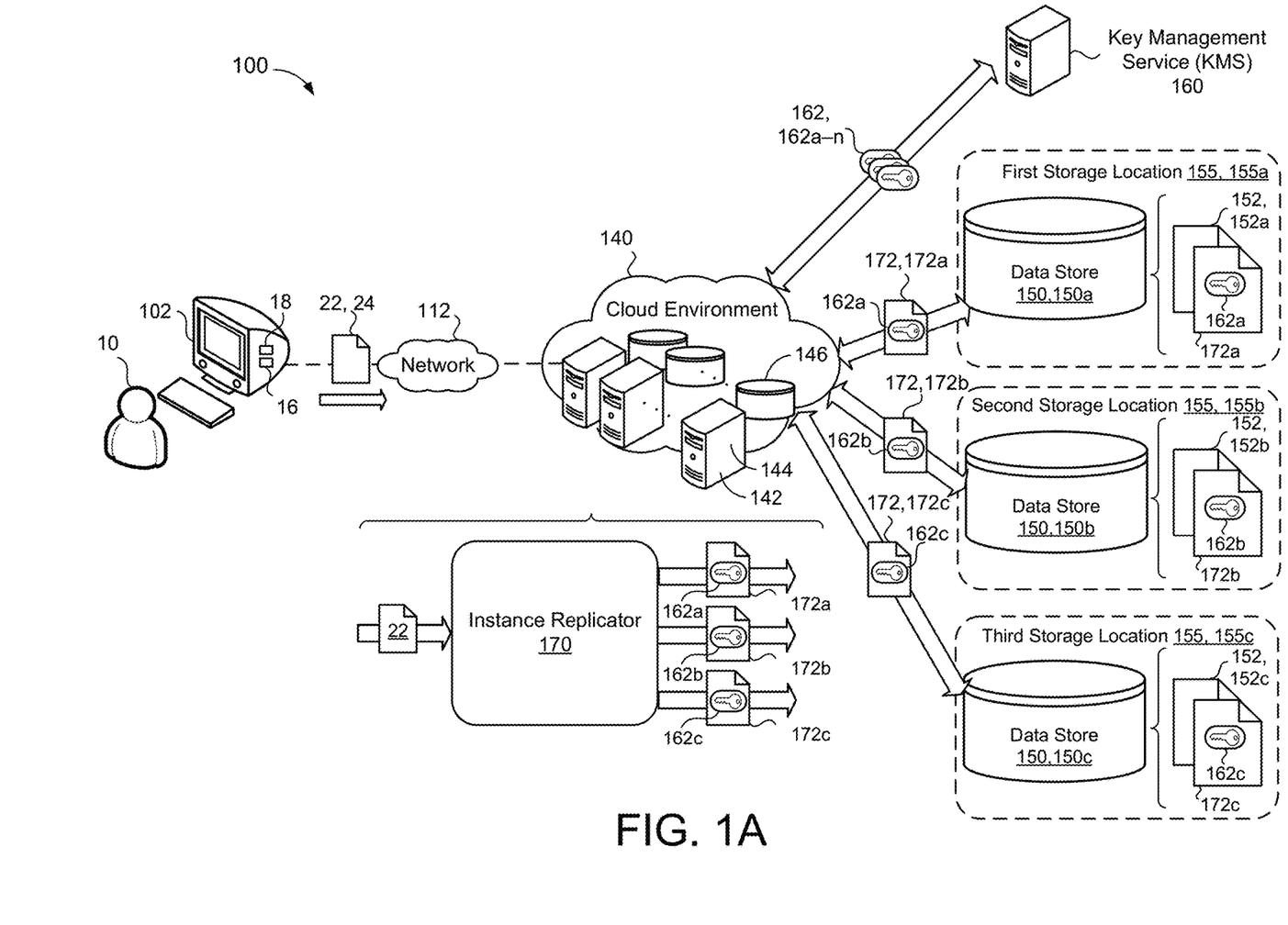
FIGS. 1A-1C are schematic views of an example system for managing data availability in replicated storage systems.
Figure 1B:
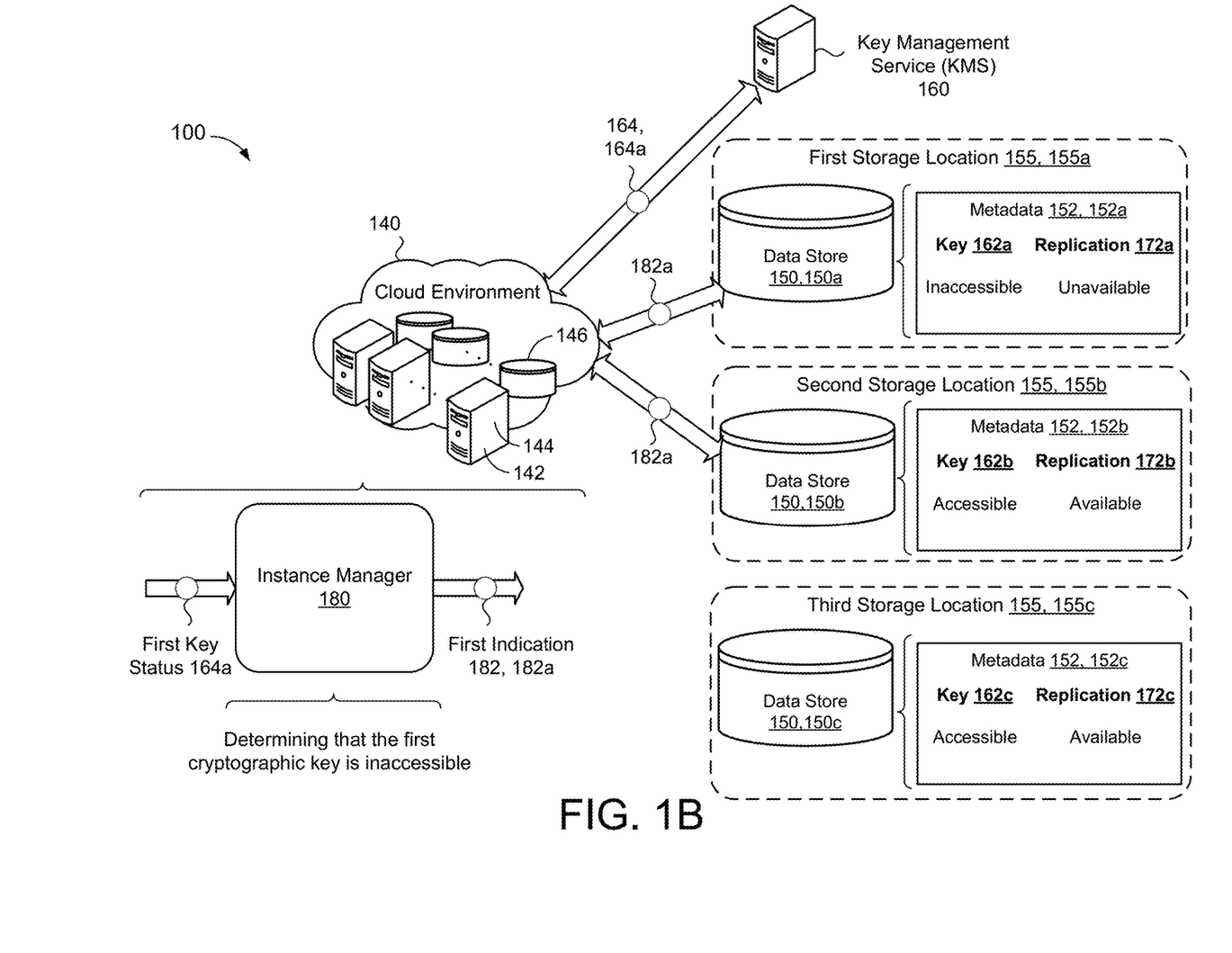
Figure 1C:
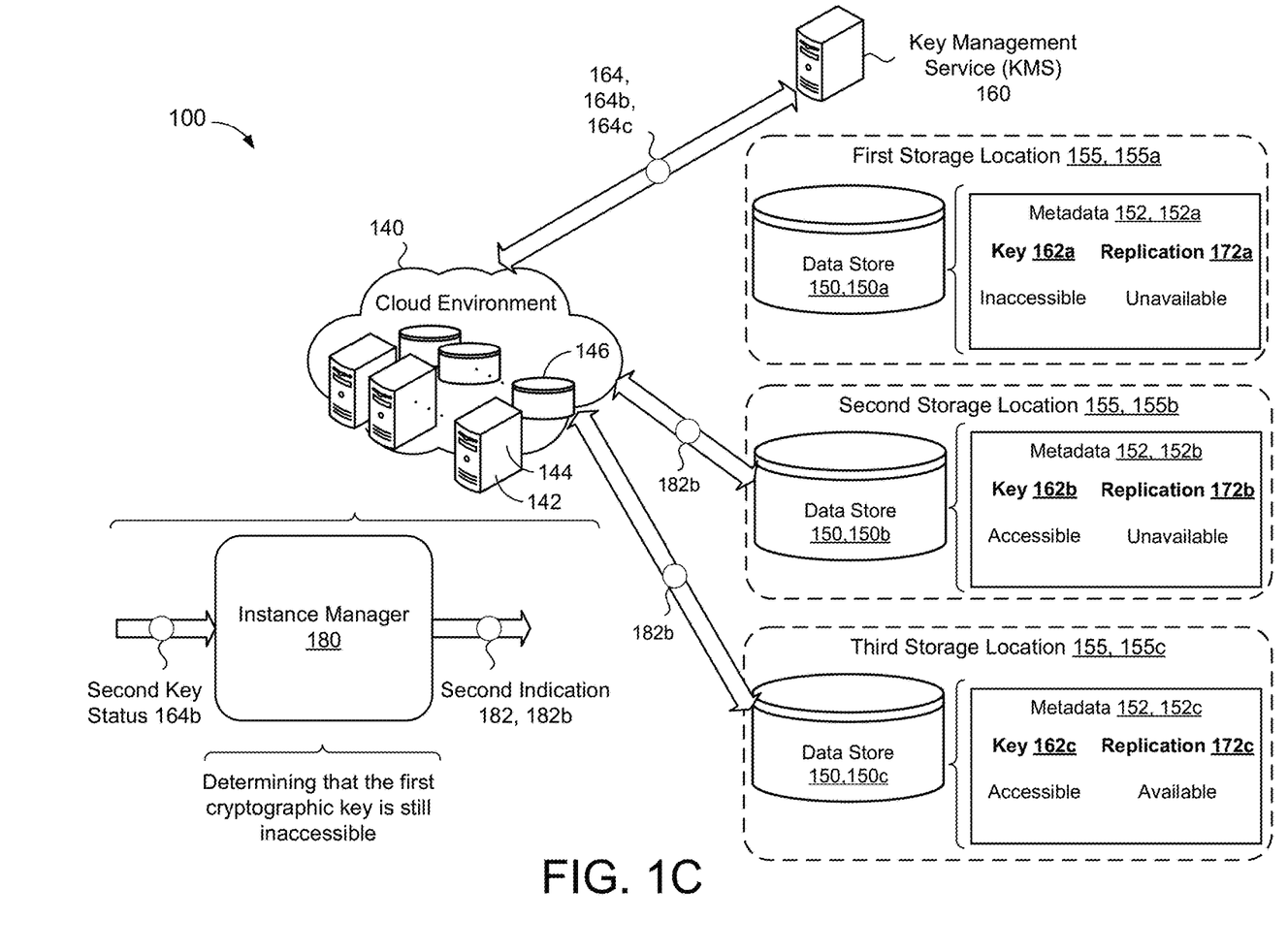

Referring now to FIGS. 1A-1C, in some implementations, an example system 100 includes a cloud computing environment (e.g., distributed storage system) 140 that stores a plurality of replication instances 172, 172a-n. The cloud computing environment 140 may be a single computer, multiple computers, or a distributed system having scalable/elastic resources 142 including computing resources 144 (e.g., data processing hardware) and/or storage resources 146 (e.g., memory hardware). A plurality of data stores 150, 150a-c (i.e., remote storage devices 150) are overlain on the storage resources 142 to allow scalable use of the storage resources 142 by one or both of the user 10 and computing resources 144. The data stores 150 may each be configured to store one or more replication instances 172 and replication metadata 152 associated with the replication instances 142. Each data store 150 is associated with a storage location 155, 155a-c within the cloud computing environment 140 and, in some examples, each storage location 155 is associated with a different geographical region. Alternatively, in other examples, each storage location 155 may be associated with a same geographical region.

In some implementations, the cloud computing environment 140 includes and/or is in communication with (e.g., via a network) a key management service (KMS) 160 that manages (directly or indirectly) a plurality of cryptographic keys (e.g., DEKs) 162, 162a-n. The plurality of cryptographic keys 162 are used by the cloud computing environment 140 to encrypt the replication instances 172, 172a-n stored on the data stores 150. For example, the KMS 160 encrypts the cryptographic keys 162 using a KEK (not shown). In other examples, the KMS 160 directly stores/controls the cryptographic keys 162. Optionally, a different cryptographic key 162 may be used to encrypt each of the replication instances 172. That is, each replication instance 172 may be encrypted by a unique DEK 162. The KMS 160 may encrypt each DEK 162 with the same KEK or a different KEK. Notably, the KMS 160 may have full control of the cryptographic keys 162 (e.g., via the KEK) while the cloud computing environment 140 may not have control of the cryptographic keys 162. For example, the cloud computing environment 140 may be required to request the KMS 160 decrypt each DEK 162 (e.g., using the corresponding KEK) prior to decrypting the replication instances 172. In this manner, the KMS 160 sends the cryptographic keys 162 to the cloud computing environment 140 to perform encryption/decryption operations on the replication instances 172 and the cloud computing environment 140 may discard the cryptographic key(s) 162 after performing the operations. Thus, the cloud computing environment 140 must request access to the cryptographic keys 162 from the KMS 160 and the KMS 160 authenticates and/or authorizes the cloud computing environment 140 before providing access to the cryptographic keys 162.

Referring now to FIG. 1A in some implementations, the example system 100 includes a user device 102 associated with a respective user 10 in communication with the cloud computing environment 140 (i.e., remote system) via a network 112. The user device 102 may correspond to any computing device, such as a desktop workstation, a laptop workstation, or a mobile device (i.e., smart phone). The user device 102 includes computing resources 18 (e.g., data processing hardware and/or storage resources 16 (e.g., memory hardware). The user 10 transmits data (i.e., replicated data) 22 using the user device 102 via the network 112 to the remote system 140 for storage at the cloud computing environment 140. The cloud computing environment 140 receives the data 22 and executes an instance replicator 170 configured to generate the plurality of replication instances 172. The instance replicator 170 encrypts each of the plurality of replication instances 172 with a respective a cryptographic key 162. In some examples, the instance replicator 170 encrypts the replication instances 172 with cryptographic keys 162 received from the KMS 160. After encrypting the replication instances 172, the instance replicator 170 may discard the cryptographic keys 162. For example, the instance replicator 170 only permanently stores an encrypted form of the cryptographic keys 162 (e.g., encrypted by a key only known to the KMS 160).

The instance replicator 170 stores the replication instances 172 encrypted by the cryptographic keys 162 at respective data stores 150. While examples herein show each replication instance 172 stored at a different data store 150, it is understood that each data store 150 may store any number of replication instances 172. In some implementations, the instance replicator 170 stores replication metadata 152, 152a-n associated with the respective replication instance 172 at the data stores 150. The replication metadata 152 may include a key status of the cryptographic key 162, a replication instance availability indicator, a timestamp associated with the replication instance 172, and/or any other information related to the cryptographic key 162 or replication instance 172.

In the example shown, the instance replicator 170 receives data 22 from the user 10 and generates three replication instances 172a-c. Here, the instance replicator 170 generates or requests three respective cryptographic keys 162a-c from the KMS 160 and encrypts each of the replication instances 172 with the respective cryptographic key 162. Thereafter, the instance replicator 170 stores the first replication instance 172a encrypted by the first cryptographic key 162a at a first data store 150a, the second replication instances 172b encrypted by the second cryptographic key 162b at a second data store 150b, and the third replication instance 172c encrypted by the third cryptographic key 162c at a third data store 150c. Optionally, the instance replication 170 may store replication metadata 152a-c associated with the instance replications 170 on the data stores 150a-c.

After the replication instances 172a-c are stored on the data stores 150a-c, the user 10 may initiate a request 24 to update the replicated data 22 associated with the stored replication instances 172 (i.e., add and/or remove data). Responsive to the request 24, the cloud computing environment 140 updates the data 22 indicated by the request 24 at each of the associated replication instances 172. However, when one of the cryptographic keys 162 used to encrypt one of the replication instances 172 is inaccessible for any reason, only the remaining replication instances 172 with accessible cryptographic keys 162 may be updated. Accordingly, the cloud computing environment 140 may generate/commit replication logs and/or synchronization signals to the replication instance 172 with the inaccessible cryptographic key 162 so that the replication instance 172 may be updated after the cryptographic key 162 becomes accessible again.

While in the example illustrated in FIG. 1A the data 22 is replicated into three replication instances 172a-c with each replication instance 172a-c stored on one of three data stores 150a-c, it is understood that the instance replicator 170 may generate any number of replication instances 172 of the data 22 and store the replication instances 172 at any number of data stores 150. In some examples, the user 10 specifies the number of replication instances 172 and the number of data stores 150 for the data 22. In other examples, the instance replicator 170 determines the number of replication instances 172 and/or the number of data stores 150 based on a data security preference provided by the user 10, available resources, or any other parameters.

Referring now to FIG. 1B, in some implementations, the cloud computing environment 140 executes an instance manager 180 configured to manage availability of the plurality of replication instances 172 stored on the data stores 150. That is, when one or more cryptographic keys 162 used to encrypt replication instances 172 are inaccessible to the cloud computing environment 140 such that the cloud computing environment 140 cannot access the replication instance 142, the instance manager 180 manages the accessibility of the remaining cryptographic keys 162 and/or replication instances 172.

In this example, the instance manager 180 obtains a first key status 164, 164a for the first cryptographic key 162a used to encrypt replicated data (i.e., data) 22 of the first replication instance 172a. The instance manager 180 determines, based on the first key status 164a for the first cryptographic key 162a, that the first cryptographic key 162a is inaccessible. In some examples, the first cryptographic key 162a is temporarily inaccessible (e.g., from the KMS 160) due to a network outage. In other examples, the first cryptographic key 162a is inaccessible because the first cryptographic key 162a is deactivated or destroyed. The first cryptographic key 162a may be inaccessible temporarily (e.g., when due to a network outage) or permanently (e.g., when due to being destroyed or revoked). Accordingly, the inaccessibility of the first cryptographic key 162a causes the first replication instance 172a to be unavailable to the cloud computing environment 140 because the cloud computing environment 140 cannot decrypt the first replication instance 172a.

In response to determining that the first cryptographic key 162a is inaccessible, the instance manager 180 generates a first indication 182, 182a. The instance manager 180 sends the first indication 182a to the first data store 150a to set the first replication instance 172a as unavailable (e.g., via the metadata 152a). That is, the replication metadata 152a for the first replication instance 172a may update to reflect that the first cryptographic key 162a is inaccessible. Moreover, the replication metadata 152a may indicate a reason that the first replication instance 172a is inaccessible. In this scenario, that the first replication instance 172a is inaccessible because the first cryptographic key 162a is inaccessible.

Additionally, the instance manager 180 sends the first indication 182a to the second data store 150b to schedule the second replication instance 172b to be unavailable after a first threshold amount of time has passed. That is, if the first cryptographic key 162a remains inaccessible for the first threshold amount of time, the second replication instance 172b will also become unavailable. For example, the instance manager 180 starts a timer when instance manager 180 determines the first cryptographic key 162a is inaccessible. If the timer expires and the first cryptographic key 162a is still inaccessible, the second replication instance 172b will become unavailable. In some implementations, the instance manager 180 continues to determine the key status 164 of the first cryptographic key 162a (e.g., via polling the KMS 160). When the first cryptographic key 162a becomes accessible before the first threshold amount of time has passed (e.g., the network outage resolves), the instance manager 180 may cancel the scheduled takedown of the second replication instance 172b and sets the first replication instance 172a as available. Otherwise, when the first cryptographic key 162a does not become accessible before the first threshold amount of time has expired, the second replication instance 172b becomes unavailable. Notably, the second replication instance 172b may be set as unavailable after the first threshold amount of time has passed regardless of the accessibility of the second cryptographic key 162b. The instance manager 180 may update metadata 152b associated with the second replication instances 172b to indicate that the second replication instance 172b is unavailable because the first cryptographic key 162a and/or the first replication instance 172a are unavailable.

Referring now to FIG. 1C and continuing the example of FIG. 1B, before the first threshold of time has expired, the instance manager obtains a second key status 164, 164b of the first cryptographic key 162a. Here, the instance manager 180 determines, based on the second key status 164b, that the first cryptographic key 162a is still inaccessible. Accordingly, after the first threshold of time has passed, the instance manager 180 generates a second indication 182, 182b to the second data store 150b to indicate the second replication instance 172b is unavailable. The replication metadata 17b for the second replication instance updates, in some examples, to reflect that the second replication instance 172b is unavailable because the first replication instance 172a is unavailable.

Additionally, the instance manager 180 sends the second indication 182b to the third data store 150c to schedule the third replication instance 172c to be unavailable after a second threshold amount of time has expired. The second threshold amount of time may be less than, equal to, or greater than the first threshold amount of time. The instance manager 180 continues to determine the key status 164 of the first cryptographic key 162a. If the first cryptographic key 162a becomes accessible before the second threshold amount of time has passed, the instance manager 180 cancels the scheduled takedown of the third replication instance 172c and sets the first replication instance 172a and second replication instance 172b as available. Otherwise, if the first cryptographic key 162a does not become accessible before the second threshold amount of time has expired, the third replication instance 172c also becomes unavailable. Notably, the third replication instance 172c may be set as unavailable after the second threshold amount of time has passed regardless of the accessibility of the third cryptographic key 162c. The instance manager 180 may continue to gradually schedule the unavailability of any number of replication instances 172. The instance manager 180 may continue determine the availability or accessibility of the first cryptographic key 162a after the threshold period of times have expired in order to reinstate the replication instances 172 should the first cryptographic key become available.

Figure 2A:
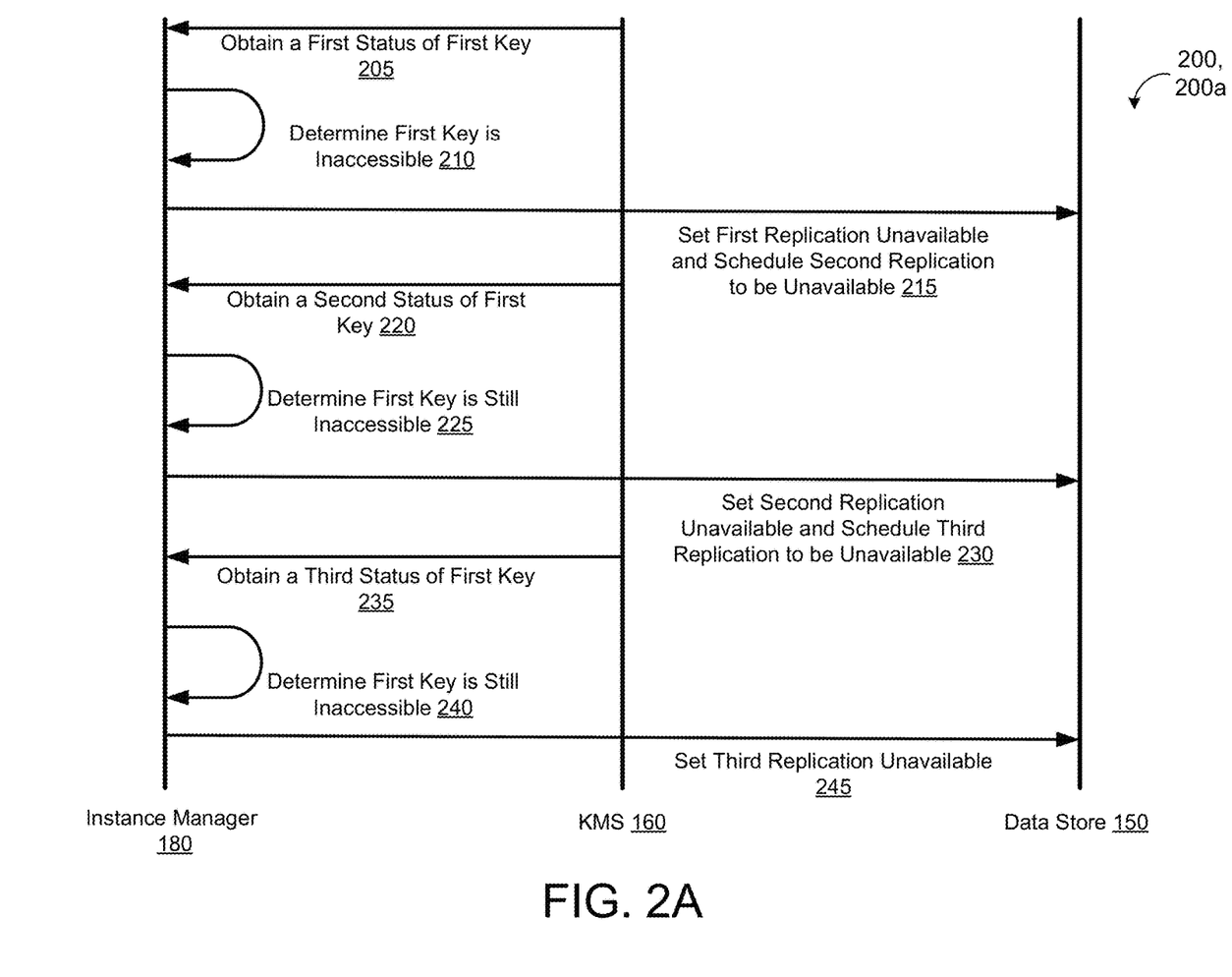
FIGS. 2A-2C are exemplary sequence diagrams for managing the availability of replication instances during cryptographic key status changes.
Figure 2B:
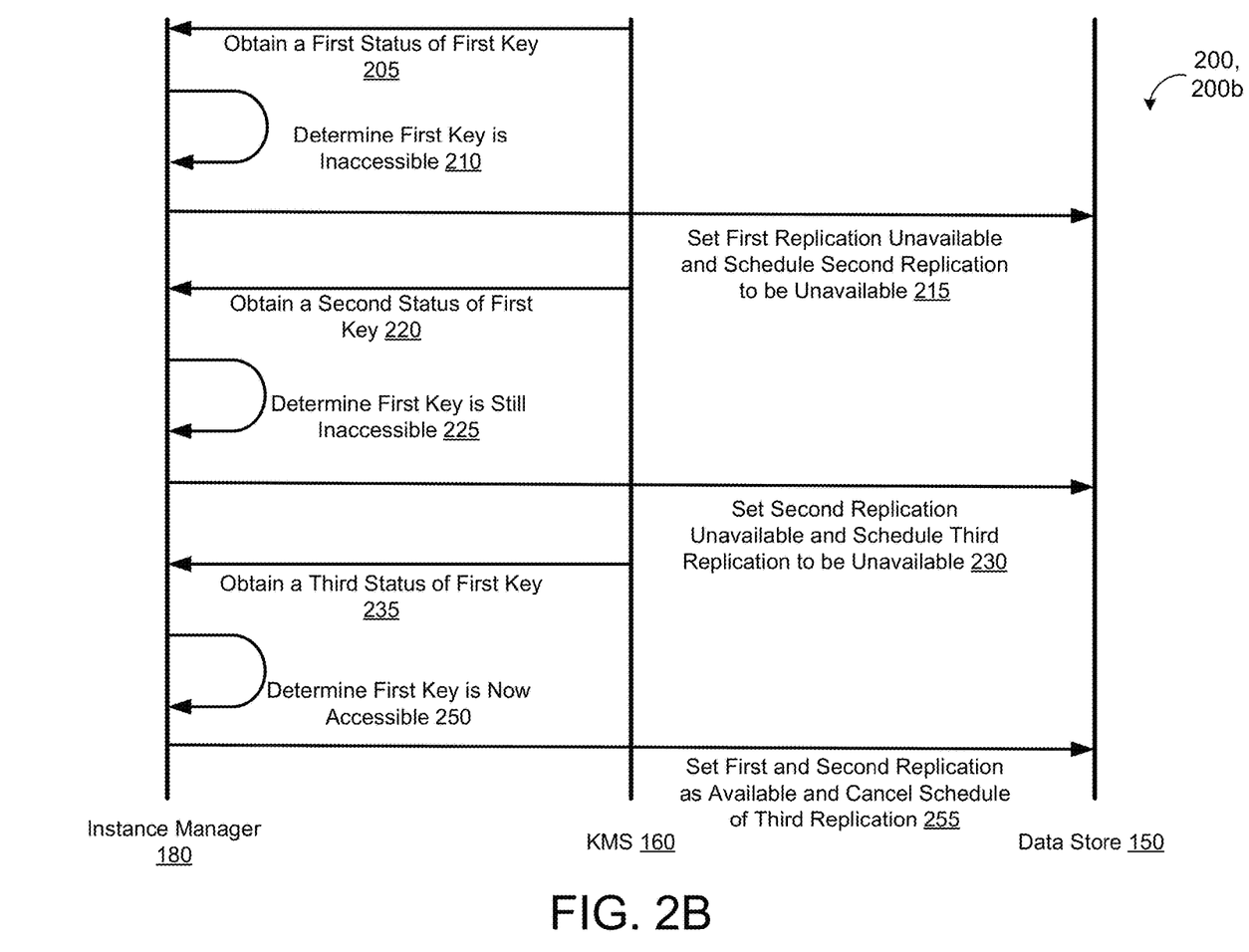
Figure 2C:
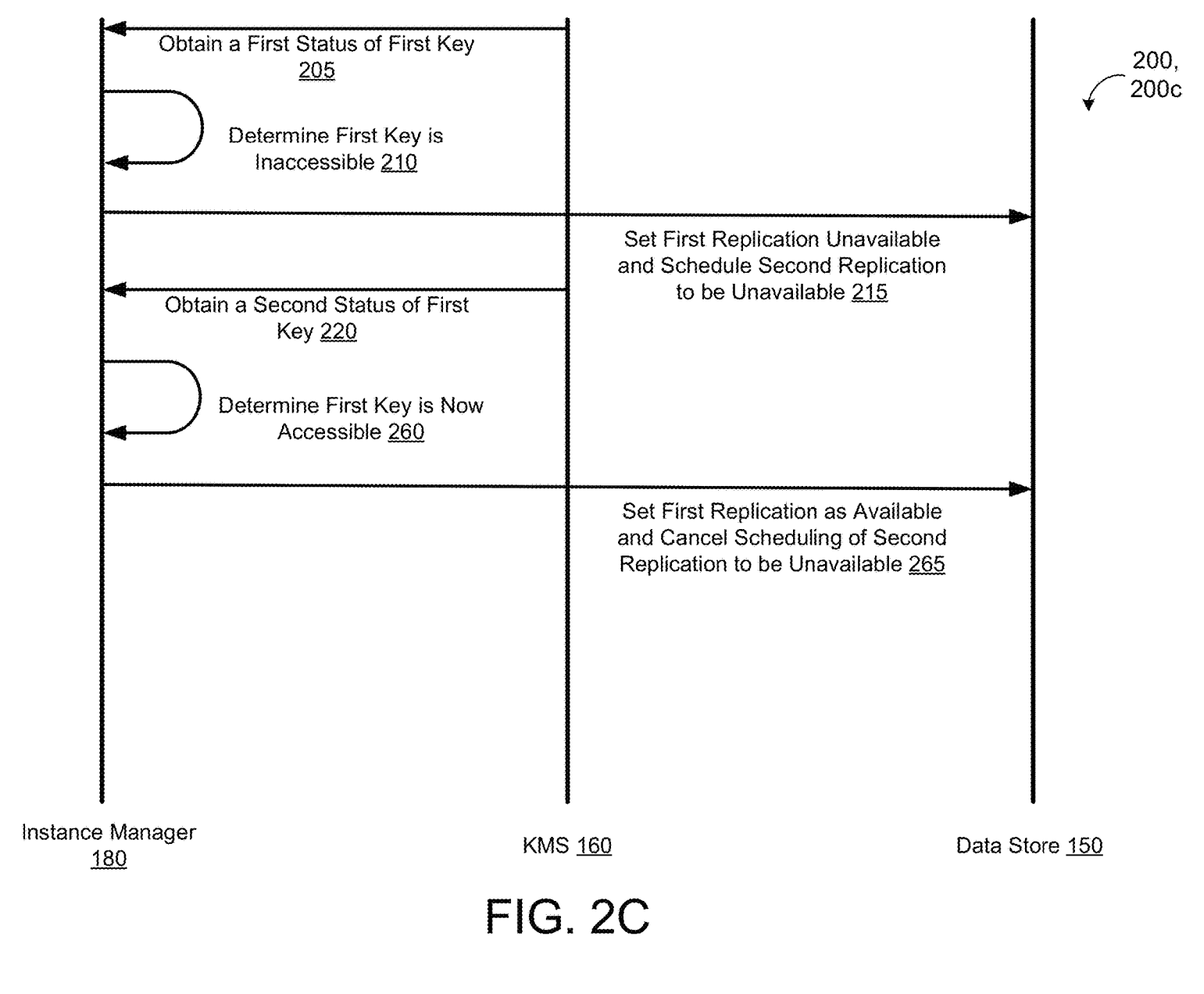

FIGS. 2A-2C provide exemplary sequence diagrams 200, 200a-c for managing the availability of replication instances 172 during cryptographic key 162 status changes as described in FIGS. 1A-1C. The Y-axis of the sequence diagrams 200 represents time increasing from top to bottom to provide an order to the operations. The operations begin at the top of the Y-axis (i.e., an earliest point in time) and proceed in order down the Y-axis. The parallel vertical lines represent the instance manager 180, the KMS 160, and the plurality of data stores 150 respectively. Referring now to FIG. 2A, the sequence diagram 200a represents a scenario where the first cryptographic key 162a is inaccessible permanently or for an extended period of time. At operation 205, the instance manager 180 obtains from the KMS 160 the first key status 164a of the first cryptographic key 162a used to encrypt the replicated data of the first replication instance 172a. The first replication instance 172a is stored at the first data store 150a at the first storage location 155a. Next, at operation 210, the instance manager 180 determines whether the first cryptographic key 162a is accessible. In the example shown, the instance manager 180 determines, based on the first key status 164a, that the first cryptographic key 162a is inaccessible. For example, the instance manager 180 may fail to receive the first key status 164a because there is a network outage between the KMS 160 and the cloud computing environment 140. In other examples, the instance manager 180 receives the first key status 164a that indicates the first cryptographic key 162a is deactivated, destroyed, or otherwise revoked. The cryptographic keys 162 may be inaccessible temporarily or permanently.

At operation 215, in response to determining that the first cryptographic key 162a is inaccessible, the instance manager 180 sets the first replication instance 172a as unavailable and schedules the second replication instance 172b to be unavailable after a first threshold amount of time has expired. That is, the instance manager 180 may send the first indication 182a to the replication metadata 152a of the first replication instance 172a and store the unavailable state of the first replication instance 172a and an indication that the first replication instance 172a is unavailable because the first cryptographic key 162a is inaccessible. Next, at operation 220, the instance manager 180 obtains the second key status 164b of the first cryptographic key 162a. That is, before the first threshold amount of time has passed (i.e., before the second replication instance 172b becomes unavailable), the instance manager 180 determines (e.g., polls) the key status 164a of the first cryptographic key 162a to determine whether the first cryptographic key 162a is now accessible. The instance manager 180 may determine the key status 164a continuously or at any interval by reading replication metadata 152a associated with the first replication instance 172a.

At operation 225, the instance manager 180 determines the first cryptographic key 162a is still inaccessible. That is, in this example, the instance manager 180 determines, based on the second key status 164b, that the first cryptographic key 162a is still inaccessible. At operation 230, in response to determining that the first cryptographic key 162a is still inaccessible after the first threshold amount of time has passed, the instance manager 180 sets the second replication instance 172b as unavailable and schedules the third replication instance 172c to be unavailable after a second threshold amount of time has passed. In some implementations, the instance manager 180 sends the second indication 182b to the replication metadata 152b of the second replication instance 172b that stores the unavailable state of the second replication instance 172b and an indication that the second replication instance 172b is unavailable because a different replication instance 172 (i.e., the first replication instance 172a in this example) is unavailable. Notably, the replication metadata 152b indicates that the second replication instance 172b is unavailable because a different replication instance 172 is unavailable. Thus, the instance manager 180 can determine that the second replication instance 172b can be set as available if the different replication instance 172 (i.e., the first replication instance 172a here) subsequently becomes available.

Next, at operation 235, the instance manager 180 obtains a third key status 164c of the first cryptographic key 162a. That is, before the second threshold amount of time has passed (i.e., before the third replication instance 172c becomes unavailable), the instance manager 180 determines, based on the key status 164a, whether the first cryptographic key 162a is now accessible. At operation 240, the instance manager 180 determines whether the first cryptographic key 162a is available. Continuing with the example shown, the instance manager 180 determines, based on the third key status 164c, that the first cryptographic key 162a is still inaccessible. At operation 245, in response to determining that the first cryptographic key 162a is still inaccessible, the instance manager 180 sets the third replication instance 172c as unavailable. Replication metadata 152c of the third replication instance 172c stores the unavailable state of the third replication instance 172c and an indication that the third replication instance 172c is unavailable because a different replication instance 172 (i.e., the first replication instance 172a) is unavailable. This process may continue for any number of replication instances 172.

In some examples, the instance manager 180 manages the availability of each of the replication instances 172 stored on the data stores 150 by polling or otherwise determining the key status 164 for each of the cryptographic keys 162 controlled by the KMS 160. When one or more of the cryptographic keys 162 becomes inaccessible, the instance manager 180 sets the corresponding replication instances 172 as unavailable in a controlled manner. For example, the instance manager 180 sets only a single replication instance 172 as unavailable after the first threshold amount of time passes. Thereafter, when the second threshold amount of time passes the instance manager sets another replication instance 172 as unavailable, and so on and so forth. In some examples, the different threshold amounts of time are configurable by the user 10.

Referring now to FIG. 2B, the sequence diagram 200b represents a scenario where a cryptographic key 162 is only temporarily inaccessible. The sequence diagram 200b includes the same operations 205-235 as described in FIG. 2A. In short, at operation 205 the instance manager 180 obtains the first key status 164a and, at operation 210, the instance manager 180 determines that the first cryptographic key 162a is inaccessible based on the first key status 164a. At operation 215, the instance manager 180 sets the first replication instance 172a as unavailable and schedules the second replication instances 172b to become unviable. Thereafter, at operation 220, the instance manager 180 obtains the second key status 164b and, at operation 225, determines the first cryptographic key 162a is still inaccessible. At operation 230, the instance manager 180 sets the second replication instance 172b as unavailable and schedules the third replication instance 172c to become unavailable. At operation 235, the instance manager 180 obtains the third key status 164c of the first cryptographic key 162a.

At operation 250, the instance manager 180 determines whether the first cryptographic key 162a is accessible for a period of time greater than the first threshold period of time. Here, the instance manager 180 determines, based on the third key status 164c, that the first cryptographic key 162a is now accessible (in contrast to FIG. 2A, where the key status 164a indicated that the first cryptographic key was still inaccessible). For example, the first cryptographic key 162a may have been reactivated by the KMS 160 or a network outage may have resolved. Accordingly, at operation 255, in response to determining that the first cryptographic key 162a is now accessible, the instance manager 180 sets the first replication instance 172a and the second replication instance 172b as available (i.e., cancels the scheduled deactivation or takedown of the second replication instance 172b). Here, the instance manager 180 determines the first replication instance 172a can be set as available because the first cryptographic key 162a is now accessible. In some examples, the instance manager 180 may further determine that the second replication instance 172b can be set as available because the reason the second replication instance 172b was unavailable is due to the first replication instance 172a being unavailable and not because of some other issue with the replication instance 172b itself. Moreover, at operation 255, the instance manager 280 cancels the scheduling for the third replication instance 172c to be unavailable after the second threshold amount of time has passed. In the example shown, the instance manager 180 indicates all three of the replication instances 172 are available after the first cryptographic key 162a becomes accessible after being temporarily inaccessible.

Referring now to FIG. 2C, the sequence diagram 200c represents another scenario where a cryptographic key 162 is temporarily inaccessible. In this scenario, the cryptographic key 162 is temporarily inaccessible for a time period that is less than the first threshold period of time (i.e., less than the scenario represented by sequence diagram 200b (FIG. 2B)). The sequence diagram 200c includes the same operations 205-220 as described in FIGS. 2A and 2B. In short, at operation 205 the instance manager 180 obtains the first key status 164a and, at operation 210, the instance manager 180 determines that the first cryptographic key 162a is inaccessible based on the first key status 164a. At operation 215, the instance manager 180 sets the first replication instance 172a as unavailable and schedules the second replication instances 172b to become unviable. Thereafter, at operation 220, the instance manager 180 obtains the second key status 164b of the first cryptographic key 162a.

At operation 260, the instance manager 180 determines whether the first cryptographic key 162a is accessible based on the second key status 164b. In the example shown, the instance manager 180 determines, based on the second key status 164b, that the first cryptographic key 162a is now accessible. At operation 265, in response to determining that the first cryptographic key 162a is now accessible, the instance manager 180 sets the first replication instance 172a as available and cancels the scheduling of the second replication instance 172b to be unavailable after the first threshold amount of time.

Thus, the instance manager 180 ensures that all replication instances 172 are unavailable after a certain amount of time has expired when a cryptographic key 162 becomes inaccessible. Therefore, the amount of accumulated replication logs is predictable. In particular, the instance manager 180 gradually sets replication instances 172 as unavailable instead of shutting down or terminating all of the replication instances 172 at once. This effectively avoids noise caused by network partition or unavailability of the KMS 160. In some examples, the instance manager determines a key status based on region (i.e., a regionalized key status checker) to enhance reliability. That is, the instance manager may determine a status of a key for each region represented by the data stores 150. The logical participants provided by the instance manager may be built into existing systems and infrastructure.

Figure 3:
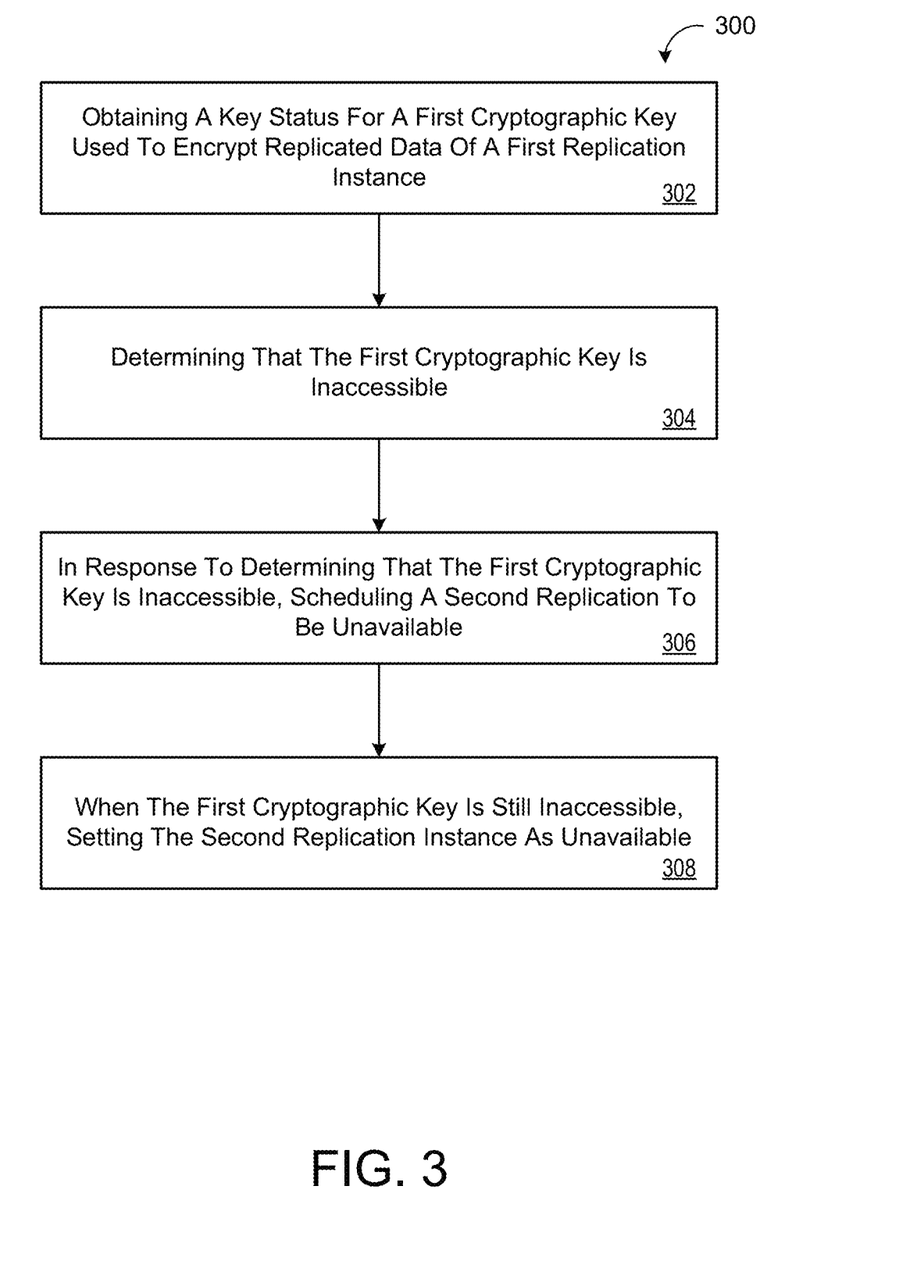
FIG. 3 is a flowchart of an exemplary arrangement of operations for a method of managing data availability in replicated storage systems.

FIG. 3 is a flowchart of an exemplary arrangement of operations for a method 300 of managing data availability in replicated storage systems. At operation 302, the method 300 includes obtaining a key status 164 (i.e., the first key status 164a) for a first cryptographic key 162a. Here, the first cryptographic key 162a is used to encrypt replicated data 22 of a first replication instance 172a. At operation 304, the method 300 includes determining, based on the first key status 164a, that the first cryptographic key 162a is inaccessible. The inaccessibility of the first cryptographic key 162a causes the first replication instance 172a to be unavailable to the cloud computing environment 140. At operation 306, in response to determining that the first cryptographic key 162a is inaccessible, the method 300 includes scheduling a second replication instance 172b to be unavailable after a threshold amount of time has passed. The second replication instance 172b includes replicated data 22 encrypted by a second cryptographic key 162b. Here, the second cryptographic key 162b used to encrypt the second replication instance 172b is different from the first cryptographic key 162a and is accessible by the cloud computing environment 140. When the first cryptographic key 162a is still inaccessible after the threshold amount of time has passed, the method 300, at operation 308, includes setting the second replication instance 172b as unavailable.

Figure 4:
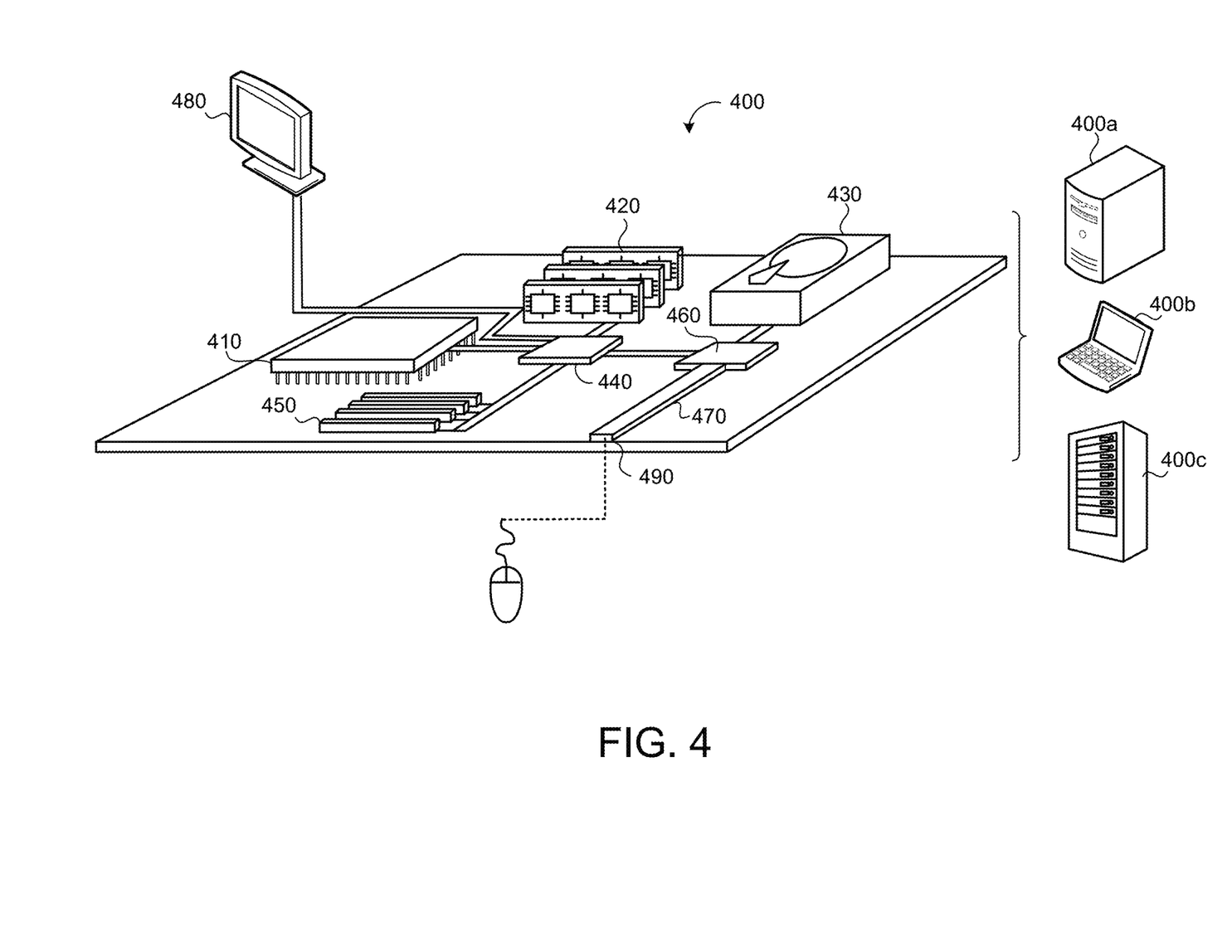
FIG. 4 is a schematic view of an example computing device that may be used to implement the systems and methods described herein.

FIG. 4 is schematic view of an example computing device 400 that may be used to implement the systems and methods described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes a processor 410, memory 420, a storage device 430, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 490. The low-speed expansion port 490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400a or multiple times in a group of such servers 400a, as a laptop computer 400b, or as part of a rack server system 400c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed by data processing hardware of a cloud computing environment that causes the data processing hardware to perform operations comprising:
    obtaining a first key status for a cryptographic key used to encrypt replicated data of a replication instance of a cloud data warehouse;
    determining, based on the first key status, that the cryptographic key is inaccessible to the data processing hardware, the inaccessible cryptographic key causing the replication instance to be unavailable for updates by the data processing hardware;
    based on determining that the cryptographic key is inaccessible to the data processing hardware, setting the replication instance as unavailable;
    obtaining a second key status for the cryptographic key;
    determining, based on the second key status, that the cryptographic key is now accessible to the data processing hardware; and
    based on determining that the cryptographic key is now accessible to the data processing hardware, setting the replication instance as available to allow updates to the replication instance by the data processing hardware.

2. The computer-implemented method of claim 1, wherein the cryptographic key is temporarily inaccessible due to a network outage.

3. The computer-implemented method of claim 1, wherein the operations further comprise, based on determining that the cryptographic key is inaccessible to the data processing hardware, scheduling a second replication instance to be unavailable after a threshold amount of time has passed.

4. The computer-implemented method of claim 3, wherein the second replication instance comprises replicated data encrypted by a second cryptographic key.

5. The computer-implemented method of claim 3, wherein the operations further comprise:
   determining that the cryptographic key is now accessible to the data processing hardware before the threshold amount of time has passed; and
   based on determining that the cryptographic key is now accessible to the data processing hardware before the threshold amount of time has passed, canceling the schedule for second replication instance to be unavailable after the threshold amount of time has passed.

6. The computer-implemented method of claim 1, wherein obtaining the second key status for the cryptographic key comprises obtaining the second key status before a threshold amount of time has passed.

7. The computer-implemented method of claim 1, wherein the operations further comprise storing, in a data store, as replication metadata associated with the replication instance, an indication that the replication instance is inaccessible because the cryptographic key is inaccessible.

8. The computer-implemented method of claim 1, wherein the cryptographic key is encrypted by a key encryption key (KEK).

9. The computer-implemented method of claim 8, wherein the data processing hardware does not have access to the KEK.

10. The computer-implemented method of claim 1, wherein the cryptographic key is stored at a key management service (KMS).

11. A system comprising:
    data processing hardware of a cloud computing environment; and
    memory hardware in communication with the data processing hardware, the memory hardware storing instructions that when executed on the data processing hardware cause the data processing hardware to perform operations comprising:
      obtaining a first key status for a cryptographic key used to encrypt replicated data of a replication instance of a cloud data warehouse;
      determining, based on the first key status, that the cryptographic key is inaccessible to the data processing hardware, the inaccessible cryptographic key causing the replication instance to be unavailable for updates by the data processing hardware;
      based on determining that the cryptographic key is inaccessible to the data processing hardware, setting the replication instance as unavailable;
      obtaining a second key status for the cryptographic key;
      determining, based on the second key status, that the cryptographic key is now accessible to the data processing hardware; and
      based on determining that the cryptographic key is now accessible to the data processing hardware, setting the replication instance as available to allow updates to the replication instance by the data processing hardware.

12. The system of claim 11, wherein the cryptographic key is temporarily inaccessible due to a network outage.

13. The system of claim 11, wherein the operations further comprise, based on determining that the cryptographic key is inaccessible to the data processing hardware, scheduling a second replication instance to be unavailable after a threshold amount of time has passed.

14. The system of claim 13, wherein the second replication instance comprises replicated data encrypted by a second cryptographic key.

15. The system of claim 13, wherein the operations further comprise:
    determining that the cryptographic key is now accessible to the data processing hardware before the threshold amount of time has passed; and
    based on determining that the cryptographic key is now accessible to the data processing hardware before the threshold amount of time has passed, canceling the schedule for second replication instance to be unavailable after the threshold amount of time has passed.

16. The system of claim 11, wherein obtaining the second key status for the cryptographic key comprises obtaining the second key status before a threshold amount of time has passed.

17. The system of claim 11, wherein the operations further comprise storing, in a data store, as replication metadata associated with the replication instance, an indication that the replication instance is inaccessible because the cryptographic key is inaccessible.

18. The system of claim 11, wherein the cryptographic key is encrypted by a key encryption key (KEK).

19. The system of claim 18, wherein the data processing hardware does not have access to the KEK.

20. The system of claim 11, wherein the cryptographic key is stored at a key management service (KMS).

* * * * *